(12) United States Patent
Zhang et al.

(10) Patent No.: US 10,699,476 B2
(45) Date of Patent: Jun. 30, 2020

(54) GENERATING A MERGED, FUSED THREE-DIMENSIONAL POINT CLOUD BASED ON CAPTURED IMAGES OF A SCENE

(71) Applicant: ams Sensors Singapore Pte. Ltd., Singapore (SG)

(72) Inventors: Chi Zhang, Fremont, CA (US); Xin Liu, Sunnyvale, CA (US); Florin Cutu, San Jose, CA (US)

(73) Assignee: ams Sensors Singapore Pte. Ltd., Singapore (SG)

( * ) Notice: Subject to any disclaimer, the term of this patent is extended or adjusted under 35 U.S.C. 154(b) by 155 days.

(21) Appl. No.: 15/749,825

(22) PCT Filed: Aug. 4, 2016

(86) PCT No.: PCT/SG2016/050377
§ 371 (c)(1),
(2) Date: Feb. 2, 2018

(87) PCT Pub. No.: WO2017/023210
PCT Pub. Date: Feb. 9, 2017

(65) Prior Publication Data
US 2018/0225866 A1    Aug. 9, 2018

Related U.S. Application Data

(60) Provisional application No. 62/201,719, filed on Aug. 6, 2015.

(51) Int. Cl.
*G06T 17/00* (2006.01)
*G06T 7/593* (2017.01)

(52) U.S. Cl.
CPC .............. *G06T 17/00* (2013.01); *G06T 7/593* (2017.01); *G06T 2207/10012* (2013.01);
(Continued)

(58) Field of Classification Search
CPC ......... G06T 17/00–30; G06T 7/50–596; G06T 2207/10012; G06T 2207/10024; G06T 2207/20221; G06T 2207/20228
See application file for complete search history.

(56) References Cited

U.S. PATENT DOCUMENTS 6,873,723 B1   3/2005  Aucsmith et al.
7,505,623 B2   3/2009  Jones et al.
(Continued)

FOREIGN PATENT DOCUMENTS

EP   2309452   4/2011
EP   2509324   10/2012

OTHER PUBLICATIONS

Dhond, U.R. et al., "Structure from Stereo—A Review," IEEE Transactions on Systems, Man, and Cybernetics, Nov./Dec. 1989, vol. 19(6):1489-1510.
(Continued)

*Primary Examiner* — Sean T Motsinger
(74) *Attorney, Agent, or Firm* — Michael Best and Friedrich LLP

(57) ABSTRACT

Presenting a merged, fused three-dimensional point cloud includes acquiring multiple sets of images of a scene from different vantage points, each set of images including respective stereo matched images and a color image. For each respective set of images, a disparity map based on the plurality of stereo images is obtained, data from the color image is fused onto the disparity map so as to generate a fused disparity map, and a three-dimensional fused point cloud is created from the fused disparity map. The respective three-dimensional fused point clouds is merged together so as to obtain a merged, fused three-dimensional point cloud. The techniques can be advantageous even under the constraints of sparseness and low-depth resolution, and are (Continued)

suitable, in some cases, for real-time or near real-time applications in which computing time needs to be reduced.

18 Claims, 6 Drawing Sheets

(52) U.S. Cl.
CPC .............. *G06T 2207/10024* (2013.01); *G06T 2207/20221* (2013.01); *G06T 2207/20228* (2013.01)

(56) References Cited

U.S. PATENT DOCUMENTS

| | | | |
|---|---|---|---|
| 8,428,342 B2* | 4/2013 | Tian | G06T 5/005 382/154 |
| 8,619,082 B1* | 12/2013 | Ciurea | H04N 13/232 345/427 |
| 9,208,571 B2* | 12/2015 | Evertt | H04N 5/2226 |
| 10,181,175 B2* | 1/2019 | Haraden | G06T 1/60 |
| 2004/0240725 A1 | 12/2004 | Xu et al. | |
| 2004/0263528 A1* | 12/2004 | Murdoch | G09G 3/3208 345/600 |
| 2006/0025888 A1* | 2/2006 | Gutmann | G06K 9/00664 700/245 |
| 2006/0056727 A1 | 3/2006 | Jones et al. | |
| 2008/0219505 A1* | 9/2008 | Morimitsu | G06K 9/00201 382/103 |
| 2008/0259073 A1* | 10/2008 | Lowe | G06T 15/20 345/419 |
| 2008/0260288 A1 | 10/2008 | Redert | |
| 2009/0213240 A1* | 8/2009 | Sim | G06T 17/00 348/222.1 |
| 2010/0302247 A1* | 12/2010 | Perez | G06K 9/00201 345/440 |
| 2011/0001799 A1 | 1/2011 | Rothenberger et al. | |
| 2011/0025827 A1 | 2/2011 | Shpunt et al. | |
| 2011/0080464 A1* | 4/2011 | Alessandrini | G06T 5/005 348/42 |
| 2011/0102438 A1* | 5/2011 | Mathe | G06F 3/017 345/426 |
| 2012/0027291 A1* | 2/2012 | Shimizu | H04N 19/597 382/154 |
| 2012/0081544 A1* | 4/2012 | Wee | G01S 17/023 348/140 |
| 2012/0207388 A1 | 8/2012 | El Dokor et al. | |
| 2012/0269458 A1* | 10/2012 | Graziosi | H04N 19/597 382/299 |
| 2013/0010073 A1* | 1/2013 | Do | H04N 13/218 348/46 |
| 2013/0071008 A1 | 3/2013 | Chen et al. | |
| 2013/0089269 A1* | 4/2013 | Barnum | G06T 5/003 382/261 |
| 2013/0100256 A1 | 4/2013 | Kirk et al. | |
| 2013/0129194 A1 | 5/2013 | Gusis et al. | |
| 2013/0136299 A1 | 5/2013 | Kim et al. | |
| 2013/0155050 A1 | 6/2013 | Rastogi et al. | |
| 2013/0259360 A1* | 10/2013 | Bingrong | G06T 7/593 382/154 |
| 2014/0139642 A1* | 5/2014 | Ni | H04N 9/09 348/48 |
| 2014/0270485 A1* | 9/2014 | Kauff | G06T 5/002 382/154 |
| 2014/0285486 A1* | 9/2014 | Chang | G06T 17/00 345/420 |
| 2014/0307057 A1 | 10/2014 | Kang et al. | |
| 2014/0340404 A1* | 11/2014 | Wang | G06T 15/20 345/427 |
| 2014/0375775 A1 | 12/2014 | Yeatman, Jr. et al. | |
| 2015/0077520 A1* | 3/2015 | Ohba | A63F 13/213 348/47 |
| 2015/0138185 A1 | 5/2015 | Huang et al. | |
| 2015/0170370 A1 | 6/2015 | Ukil et al. | |
| 2015/0187067 A1* | 7/2015 | Bendall | G06F 3/04847 382/141 |
| 2015/0300816 A1* | 10/2015 | Yang | A61B 90/35 600/424 |
| 2015/0326845 A1* | 11/2015 | Liang | G06T 7/11 382/154 |
| 2015/0347872 A1* | 12/2015 | Taylor | G06T 7/187 382/224 |
| 2016/0012646 A1* | 1/2016 | Huang | G06T 5/005 345/419 |
| 2016/0080626 A1* | 3/2016 | Kovtun | H04N 5/2355 348/218.1 |
| 2016/0255332 A1* | 9/2016 | Nash | G06F 11/10 348/46 |
| 2017/0069071 A1* | 3/2017 | Jung | G06K 9/00201 |
| 2017/0140578 A1* | 5/2017 | Xiao | G06T 17/00 |
| 2017/0323455 A1* | 11/2017 | Bittan | G01C 3/08 |
| 2017/0353708 A1* | 12/2017 | Petrichkovich | G06T 7/97 |
| 2018/0084240 A1* | 3/2018 | Campbell | G06T 7/0002 |
| 2018/0218485 A1* | 8/2018 | Xi | G06T 5/50 |
| 2018/0218511 A1* | 8/2018 | Chan | H04N 19/54 |
| 2018/0225866 A1* | 8/2018 | Zhang | G06T 17/00 |

OTHER PUBLICATIONS

E. Olson et al., "An Introduction to Stereo Vision and Disparity Computation," 3 pages (downloaded from Internet, May 7, 2015).
Henry, P. et al., "RGB-D mapping: Using Kinect-style depth cameras for dense 3D modeling of indoor environments," The International Journal of Robotics Research 31(5) 2012, pp. 647-663.
International Search Report of ISA/AU for PCT/SG2016/050377 (dated Oct. 27, 2016).
J/ Salvi et al., "Pattern codification strategies in structured light systems," 18 pages (downloaded from Internet, May 7, 2015).
Ohm, J. et al., "A realtime hardware system for stereoscopic videoconferencing with viewpoint adaptation," International Workshop on Synthetic-Natural Hybrid Coding and Three Dimensional Imaging (IWSNHC3DI'97), 1997.
Somanath, G et al., "Sterio+Kinect for High Resolution Stereo Correspondences", 2013 International Conference on 3D Vision, Jun. 29-Jul. 1, 2013, pp. 9-16.
Yong, D. et al., "A Real-Time System for 3D Recovery of Dynamic Scene with multiple RGBD Imagers," IEEE Computer Society conference on Computer Vision and pattern Recognition Workshops (CVPRW), Jun. 20-25, 2011, pp. 1-8, IEEE.

* cited by examiner

GENERATING A MERGED, FUSED THREE-DIMENSIONAL POINT CLOUD BASED ON CAPTURED IMAGES OF A SCENE

TECHNICAL FIELD

This disclosure relates to image processing and, in particular, to systems and techniques for generating a merged, fused three-dimensional point cloud based on captured images of a scene.

BACKGROUND

An image can be considered a projection from a three-dimensional (3D) scene onto a two-dimensional (2D) plane. Although a 2D image does not provide depth information, if two images of the same scene are available from different vantage points, the position (including the depth) of a 3D point can be found using known techniques.

For example, stereo matching is a process in which two images (a stereo image pair) of a scene taken from slightly different viewpoints are matched to find disparities (differences in position) of image elements which depict the same scene element. The disparities provide information about the relative distance of the scene elements from the camera. Stereo matching enables disparities (i.e., distance data) to be computed, which allows depths of surfaces of objects of a scene to be determined. A stereo camera including, for example, two image capture devices separated from one another by a known distance, which may be referred to as the baseline distance, can be used to capture the stereo image pair.

Some image capture modules include two grey-scale depth stereo cameras and an RGB camera. This type of module may be used, for example, in a mobile application (e.g., a smart phone) and, thus, the footprint of the module tends to be small. When the module's footprint is small, the baseline distance between the two depth cameras will likewise be small. Small baselines in stereo systems, however, lead to low depth or z-resolution. Further, the disparity map derived from the two depth cameras tends to be sparse. Sparse disparity maps can be a result of scenes with little texture (e.g., a monochromatic wall). Further even if a light projector is used to project texture onto the scene, the resultant disparity map may be sparse if the projected pattern is not very dense.

SUMMARY

The present disclosure describes systems and techniques for generating a merged and fused 3D point cloud, even under the constraints of sparseness and low-z resolution. The techniques are suitable, in some cases, for real-time or near real-time applications in which computing time needs to be reduced.

A single 3D point cloud can be generated, for example, from a combination of a disparity map of a scene captured by two depth cameras at a first position, and geometric information of the depth camera system (e.g., baseline distance and focal length). The 3D point cloud thus contains disparity data (i.e., coordinates of object feature points (x, y, z)). A fused 3D point cloud is one where color data of object feature points also is included (x, y, z, c). A merged 3D point cloud is one that merges point clouds generated from multiple module positions (i.e., capturing images of the scene from different vantage points). Since the depth cameras have an inherently limited field of view (FOY), the depth cameras are moved to different points (e.g., around an object or other scene) to obtain disparity maps, and ultimately 3D point clouds, from different perspectives of the scene. Consequently, the merged 3D point cloud is a 3D representation of the scene. The merged 3D point cloud can be generated from multiple 3D point clouds via a process referred to as registration. Registration relates key points (e.g., points of interest in common) in a first 3D point cloud with key points in a second 3D point cloud. Key points between different 3D point clouds are related by translation data. Thus, the translation data enables the 3D point clouds to be merged together.

As described in greater detail below, an apparatus includes an optoelectronic module that includes two (or more) depth channels, each of which has a respective image capture device (e.g., camera), and a color image capture device (e.g., a RGB camera). The apparatus is arranged to generate a, merged, fused 3D point cloud, which can be displayed, for example on the screen of a computing device (e.g., a smart phone or other small device).

An example of a user application is to rotate the merged, fused 3D point cloud displayed on a computer screen using, for example, a cursor so that different perspectives of the merged, fused 3D point cloud of the scene can be viewed as the point cloud is rotated. Thus, in response to receiving user input (e.g., through an electronic mouse, trackball, or other user input device), the display device rotates the merged, fused 3D point cloud displayed on a display device (e.g., a CRT (cathode ray tube) or LCD (liquid crystal display) monitor). In some cases, the merged, fused 3D point cloud can be displayed as a CAD model on the computer screen or may be used, as input, for example, to a 3D printer.

As mentioned above, the present techniques can be used advantageously even in situations in which the disparity information is relatively sparse (e.g., resulting from lower quality sensors or pattern projection units), the baselines are relatively small (i.e., resulting in poorer z-resolution), and in which less computing power is available and/or there are more rigorous restrictions on computing time.

In some implementations, a multi-channel optoelectronic module can be used to generate a fused, merged 3D point cloud. The module includes at least two depth channels (e.g., IR sensitive, low-resolution), an RGB channel (e.g., high resolution), and in some cases also an IR projector. Such an approach can, in some implementations, overcome the challenges of sparse disparity maps, low-z resolution, and computational demands (e.g., the need for rapid speed). As described in greater detail below, the RGB data can be used to augment or otherwise enhance the registration process, and to thereby merge individual 3D point clouds into a merged 3D point cloud.

Other aspects, features and advantages will be readily apparent from the following detailed description, the accompanying drawings, and the claims.

DETAILED DESCRIPTION

Figure 1:
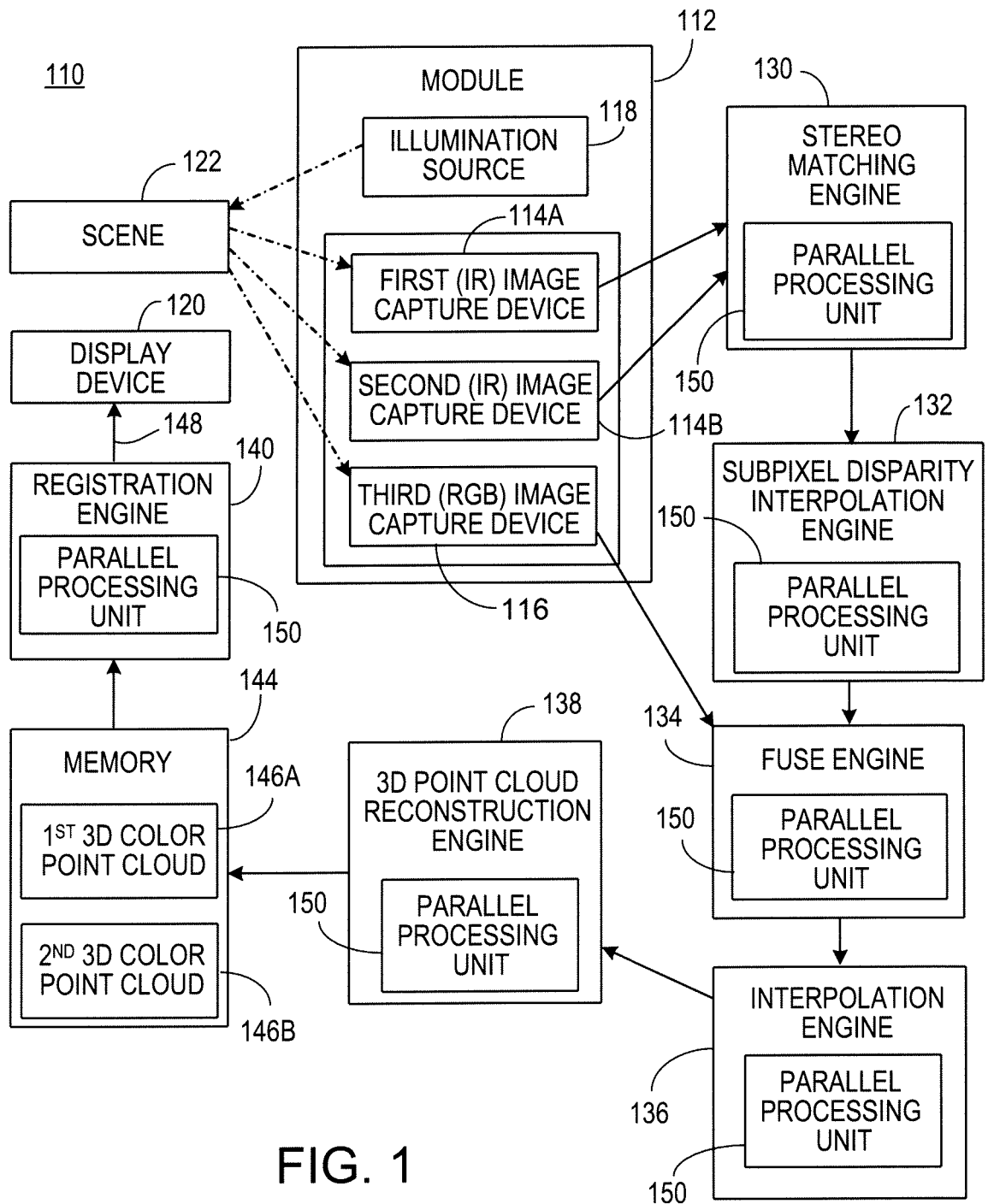
FIG. 1 illustrates an example of an apparatus for generating a merged, fused 3D point cloud based on captured images of a scene in accordance with the invention.

As shown in FIG. 1, an apparatus 110 includes an opto-electronic module 112 that includes two (or more) depth channels, each of which has a respective image capture device (e.g., camera) 114A, 114B, and third channel, which has a color image capture device (e.g., a RGB camera) 116. The apparatus 110 is arranged to generate a merged, fused 3D point cloud based on images captured by the cameras 114A, 114B, 116, and to display the merged, fused 3D point cloud, for example, on the screen of a computing device (e.g., a smart phone or other small device) 120. Different depths (or ranges of depth) can be displayed on the screen of the computing device, for example, as different colors or using other visual indicators.

The cameras 114A, 114B are arranged to capture stereo image data of a scene 122, and the camera 116 is arranged to capture a color image of the scene 122. Each of the image capture devices 114A, 114B can be implemented, for example, as an infra-red (IR) CMOS image sensor or CCD image sensor. Likewise, the image capture device 116 can be implemented, for example, as a RGB CMOS image sensor or CCD image sensor. In some instances, the depth cameras 114A, 114B are low-resolution cameras (e.g., QQVGA), whereas the camera 116 for the third channel is a high-resolution camera (e.g., VGA or greater). Further, as the depth cameras 114A, 114B have an inherently limited field of view (FOV), the module 112 is movable to different points so that the cameras can obtain information from different perspectives around the scene 122. Movement of the module (or the cameras) can be automated. Movement of the module (e.g., within a smart phone or other device) can be automated. In other instances, the object can be moved around the module, which is held stationary, while images of the object are acquired from multiple perspectives.

In some cases, the module 112 also may include an associated illumination source 118 arranged to project a pattern of illumination onto the scene 122. When present, the illumination source 118 can include, for example, an infra-red (IR) projector operable to project a pattern (e.g., of dots or lines) onto objects in the scene 122. The illumination source 118 can be implemented, for example, as a light emitting diode (LED), an infra-red (IR) LED, an organic LED (OLED), an infra-red (IR) laser or a vertical cavity surface emitting laser (VCSEL). The projected pattern of optical features can be used to provide texture to the scene to facilitate stereo matching processes between the stereo images acquired by the devices 114A, 114B.

The apparatus 110 further includes various engines to process images acquired by the cameras 114A, 114B, 116. In particular, the apparatus 110 includes a stereo matching engine 130, a subpixel disparity interpolation engine 132, a fuse engine 134, an interpolation engine 136, a 3D point cloud reconstruction engine 138 and a registration engine 140. Details regarding the functionality or algorithms implemented by these engines are described below.

The apparatus 110 also includes memory 144, which can store the images acquired by the cameras 114A, 114B, 116, as well as various data processed or output by the engines 130-140. For example, as illustrated in FIG. 1, the memory 144 can store two or more 3D color point clouds 146A, 146B generated by the 3D point cloud reconstruction engine 138.

Each of the foregoing engines 130, 132, 134, 136, 138, 140 can be implemented, for example, using a computer and can include a respective parallel processing unit 150 (e.g., an application specific integrated circuit (ASIC) or a field programmable gate array (FPGA)). Further, in other instances, the foregoing engines 130, 132, 134, 136, 138, 140 can be implemented in software (e.g., using a processor of the mobile device (e.g., smartphone)). Although the various engines 130-140 and memory 144 are shown in FIG. 1 as being separate from the module 112, in some implementations they may be integrated as part of the module 112. For example, the engines 130-140 and memory 144 may be implemented as one or more integrated circuit chips mounted on a printed circuit board (PCB) within the module 112, along with the image capture devices 114A, 114B, 116. In some cases, the illumination source 118 (if present) may be separate from the module 112 that houses the image capture devices 114A, 114B, 116. Further, the module 112 also can include other processing and control circuitry. Such circuitry also can be implemented, for example, in one or more integrated circuit chips mounted on the same PCB as the image capture devices.

Figure 2:
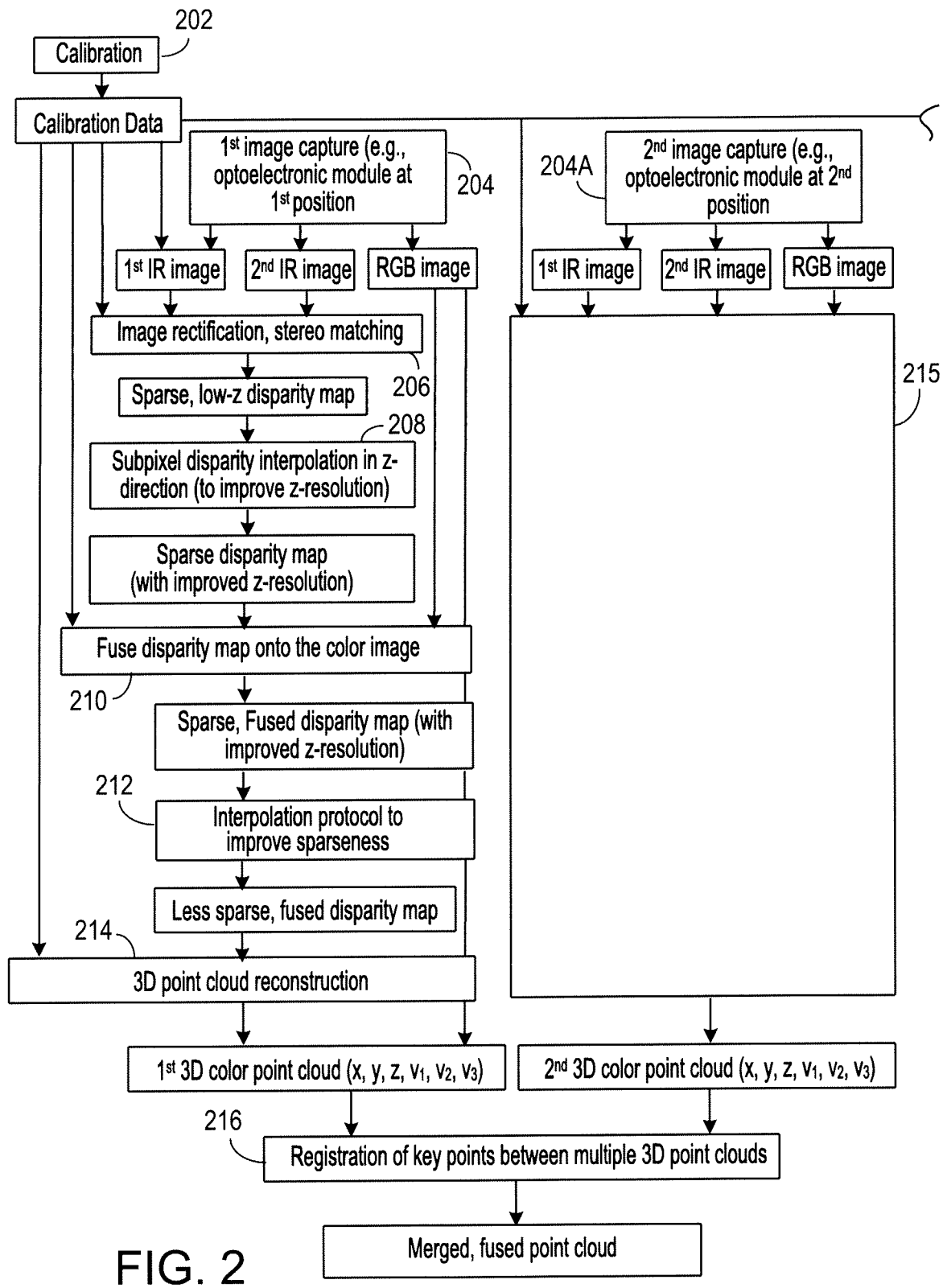
FIG. 2 is a flow chart illustrating an example of a method for generating a merged, fused 3D point cloud based on captured images of a scene in accordance with the invention.

Referring now to the flow chart of FIG. 2, calibration may be performed with respect to each of the channels (i.e., all three cameras 114A, 114B, 116) and may be performed, for example, by the manufacturer before the module 112 reaches the end user (see 202). In some cases, calibration may be performed by the end user on a periodic basis. The calibration operation generates calibration data, which may be used during one or more stages of the image processing.

As indicated by FIG. 2 (204), each of the image capture devices 114A, 114B, 116 acquires an image of the scene 122 from a first position. The depth images acquired by the stereo cameras 114A, 114B are provided to the stereo matching engine 130, which performs image rectification and applies a stereo matching algorithm to the images (206). Block matching is an example of stereo matching. An example of a block matching technique is described in the following paragraph. However, depending on the implementation, other types of matching algorithms may be used as well. For example, edge based, coarse-to-fine, adaptive windows, dynamic programming, Markov random fields, graph cuts, or multi-baseline stereo matching techniques can be used.

A block matching algorithm allows disparity information to be computed from the pair of stereo images by first computing the distance in pixels between the location of a feature in one image and the location of the same or substantially same feature in the other image. In this case, an image acquired by a first one of the stereo imagers 114A is used as a reference image; an image acquired by a second one of the stereo imagers 114B is used as a search image. Thus, the second image is searched to identify the closest match for a small region (i.e., block of pixels) in the first image.

Various techniques can be used to determine how similar regions in the two images are, and to identify the closest match. One such known technique is the "sum of absolute differences," sometime referred to as "SAD." To compute the sum of absolute differences between a template and a block, a grey-scale value for each pixel in the template is subtracted from the grey-scale value of the corresponding pixel in the block, and the absolute value of the differences is calculated. Then, all the differences are summed to provide a single value that roughly measures the similarity between the two image regions. A lower value indicates the patches are more similar. To find the block that is "most similar" to the template, the SAD values between the template and each block in the search region is computed, and the block with the lowest SAD value is selected. The disparity refers to the distance between the centers of the matching regions in the two images. In a disparity map, pixels with larger disparities are closer to the camera, and pixels with smaller disparities are farther from the camera.

The output of the stereo matching engine 130 is a disparity map, which in some cases, may be relatively sparse and may have relatively low depth resolution. In this context, a sparse disparity map refers to the fact that many pixels in the disparity map may not be assigned a disparity value. Sparseness may result, for example, for any number of reasons, including low-resolution depth channels, low-quality optics, pixels values (e.g., IR) that fail to collect all of the image features, the low density of the pattern projected onto the scene, and/or low texture of the scene. The foregoing factors can result in fewer identifiable points in the image that can be used to calculate disparity. Further, if the baseline distance between the two stereo imagers 114A, 114B is small, the disparity map will tend to have low depth resolution.

The disparity map generated by the stereo matching engine 130 is provided to the subpixel disparity interpolation engine 132, which performs subpixel disparity interpolation on the disparity map (208). Such subpixel interpolation can be particularly advantageous, for example, in long range applications of stereo vision, which require accurate subpixel level disparity estimates. Known subpixel interpolation techniques, such as the surface interpolation algorithm, the semi-global matching (SGM) stereo algorithm, or use of a linear function, can be used and improve the depth resolution of the disparity map.

The disparity map generated by the subpixel disparity interpolation engine 132, as well as the color image acquired by the third camera 116, is provided to the fuse engine 134, which fuses the color image data onto the disparity map (210). The fusing process sometimes is referred to as warping. In general, fusing can encompass the conversion of pixel values (e.g., color values to grey-scale values) and also can encompass the conversion of a high-resolution image to a low-resolution image. That is, the fusing process may apply a scale factor for conversion between images of different resolutions. The calibration data from the initial calibration step (202) also is provided for the fusing process. That is, the relationship (e.g., spatial) between the images needs to be well defined because the RGB image acquired by the camera 116 is captured from a different perspective, using a particular baseline distance with respect to the other depth cameras 114A, 114B. The output of the fuse engine 134 in this implementation is a fused disparity map (i.e., with color data) having improved resolution. The disparity, however, may still be relatively sparse.

The image processing techniques also include a second interpolation process (212), a 3D point cloud reconstruction process (214), and registration process (216). These processes are described below. In some implementations, the fusing (i.e., warping) process of 210 may be performed after the interpolation process of 212, so long as the fusing process is performed before the registration process of 216. In that case, the inputs and outputs of the various engines in FIG. 1 would be rearranged accordingly.

To improve the sparseness of the disparity map, the interpolation engine 136 applies a second interpolation process to fill out disparity values in the disparity map (212). As noted above, if the fusing process has already been performed, then the interpolation engine 136 receives the fused disparity map generated by the fuse engine 134 and performs the second interpolation process with respect to the fused disparity map. Alternatively, if the fusing process is to be performed at a later stage in the overall process, then the interpolation engine 136 would receive the disparity map generated by the subpixel disparity interpolation engine 132 and would perform the second interpolation process with respect to that disparity map.

Although any one of various interpolation processes to improve sparseness can be applied by the interpolation engine 136, a preferred technique for some implementations is set forth in FIG. 3 and is described below. This interpolation technique facilitates rapidly accomplishing sparseness improvement, thereby permitting its use, for example, in real-time or near real-time applications. The output of the interpolation engine 136 is a disparity map with relatively low sparseness. In implementations where the interpolation process of 212 is performed after the fusing process of 210, the output of the interpolation engine 136 is a fused disparity map with relatively low sparseness.

As further illustrated by FIG. 2, the image processing includes conversion of the disparity map into a 3D depth map. This phase of the process can be implemented by the 3D point cloud reconstruction engine 138, which creates a 3D point cloud from the previously-obtained disparity map (214). In this example, the output of the reconstruction engine 138 is a first 3D color point cloud 146A, which includes color data (e.g., R, G, B) for each point in space (i.e., x, y, z). The 3D color point cloud 146A can be stored, for example, in the memory 144.

As further indicated by FIG. 2, images of the scene 122 are acquired by the image capture devices 114A, 114B, 116 from a second position of the module 112 (204A). The processes of 206 through 214 then are performed with respect to image of the scene 122 acquired by the image capture devices at the second position. Performance of these processes is indicated collectively by 215, which provides as output a second 3D color point cloud 146B, which includes color data (e.g., R, G, B) for each point in space (i.e., (x, y, z)). The 3D color point cloud 146B also can be stored in the memory 144.

In some implementations, the color data ($v_1$, $v_2$, $v_3$) can be expressed in combinations other than red (R), green (G) and blue (B). Further, in some cases, additional 3D color point clouds can be obtained based on images of the scene 122 acquired by the image capture devices 114A, 114B, 116 from other vantage points. In any event, the various 3D point clouds 146A, 146B are provided to the registration engine 140, which also receives as input the image data from the third image capture device 116. As noted above, the data from the third image capture device 116 includes color (e.g., RGB) image data for the scene 122. The registration engine 140 uses the 2D color information to enhance the registration process, which merges the individual 3D point clouds 146A, 146B. The third (color) image can facilitate the registration process, which would otherwise be difficult to accomplish with a sparse, low-z resolution input. Details of the registration process implemented by the engine 140 in some instances are illustrated in FIG. 4.

The registration engine 140 generates and outputs a merged, fused 3D point cloud by performing the registration process (216). Further details of the registration process 216 according to some implementations are described below. The merged, fused 3D point cloud can be provided, for example, to a display device 120 that includes a graphical user interface. The merged, fused 3D point cloud thus can be displayed on a viewing screen of the display device 120. A user can rotate the merged, fused 3D point cloud displayed on the screen using, for example, a cursor, so that different perspectives of the scene 122 can be viewed on the display screen as the 3D point cloud is rotated. Thus, in response to user input, the point cloud on the display screen is rotated.

Figure 3:
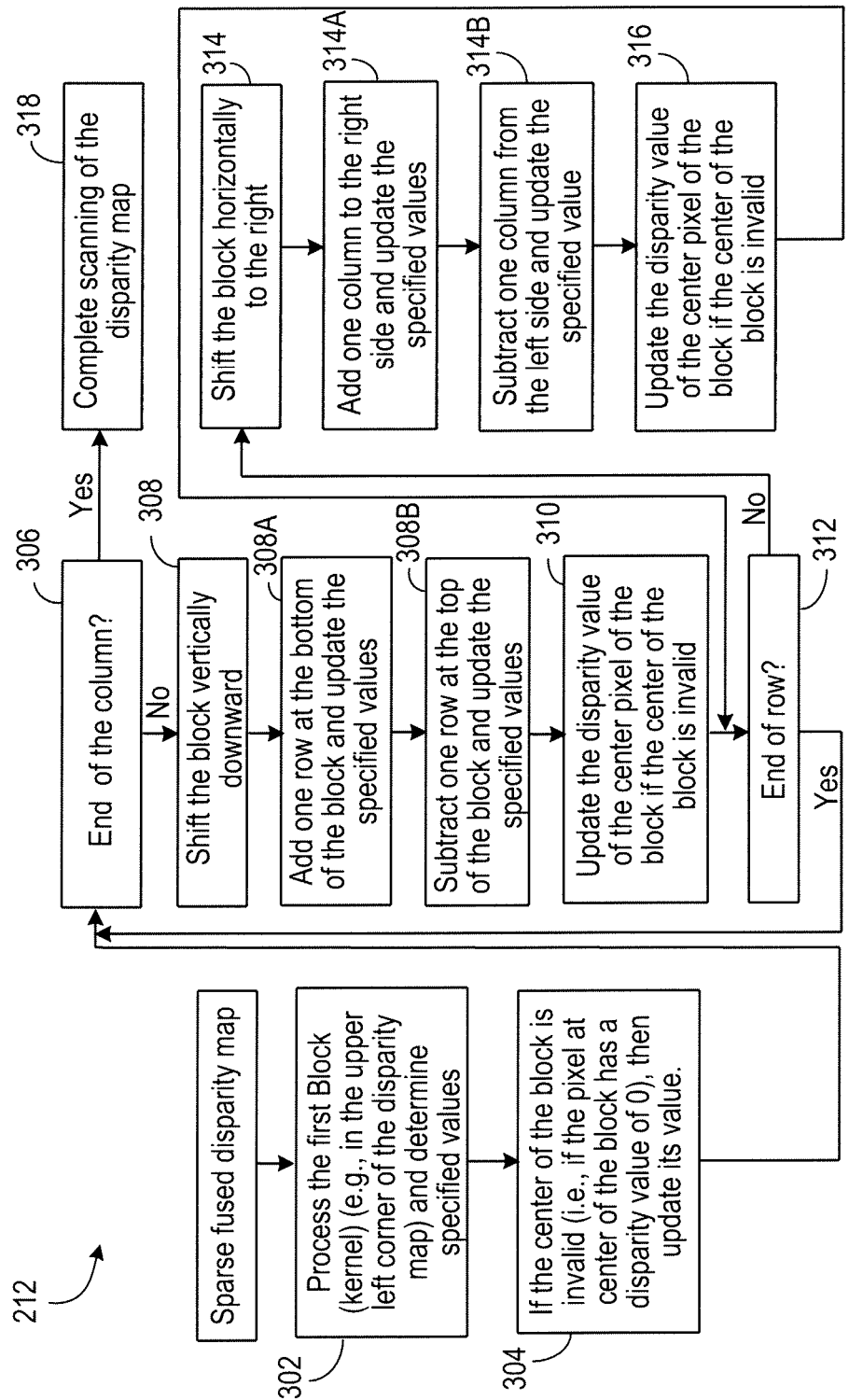
FIG. 3 is a flow chart illustrating an example of an interpolation process to fill out disparity values in a disparity map.

FIG. 3 illustrates further details of the interpolation process (212 in FIG. 2) according to some implementations. In general, a block processing technique is used to reduce the sparseness, and increase the density, of the disparity map. An edge-preserved technique can be used that is computationally fast and that preserves geometric edges, thereby avoiding blurring of geometric edges in the density map. In this context, "geometric edges" refer to edges delineated by disparity values (as opposed to "contrast edges" which refer to edges delineated by pixel values or gradient values such as intensity gradients, RGB gradients, or grey-scale gradients).

As shown in FIG. 3, at 302, the interpolation engine 136 processes an initial block (or kernel) of the disparity map (which may be stored, for example, in an input buffer) and determines certain specified values. The initial block can be located, for example, in the upper left corner of the disparity map, and represents a window encompassing a predetermined number of pixels. The size of the block may depend, for example, on various factors such as the sparseness of the disparity map and the noise level. For example, in some instances, the greater the sparseness, the larger the block size. Typical block sizes are 5×5 pixels, 7×7 pixels, or 11×11 pixels. Other block sizes may be appropriate for some applications. For example, in some implementations the block can include even numbers of pixel rows and columns (e.g., 6×6, 10×10, or 12×12). In such instances, the interpolation process 212 should be modified accordingly, for example, by assigning a different weighted number to a plurality of center pixels (or other designated pixels) according to the distribution within the block. In any event, in the illustrated example, the interpolation engine 136 computes the following values for the block: (i) sum of the valid (i.e., non-zero) disparity values for pixels within the block; (ii) number of valid pixels within the block; (iii) maximum disparity value and its frequency of occurrence within the block; (iv) second maximum disparity value and its frequency of occurrence within the block; (v) minimum disparity value and its frequency of occurrence within the block; (vi) second minimum disparity value and its frequency of occurrence within the block. The sum of the square of the valid disparity values for pixels within the block also can be computed. The foregoing value can be stored, for example, in temporary buffers associated with the interpolation engine 136 for use in subsequent processing steps.

Next, as indicated by 304, if the current disparity value is invalid (i.e., if it previously was assigned a value of 0 or was assigned no value), then the interpolation engine 136 updates the disparity value of the center pixel of the block. In particular, the interpolation engine 136 updates the disparity value of the center pixel based on which of several scenarios is applicable. A first scenario is applicable if the number of valid pixels in the block is smaller than a first predefined value, which may refer to the Valid Number Threshold. In that case, the center pixel of the block remains invalid and its value remains 0. A second scenario is applicable if the block has a sufficient number of valid pixels such that the disparity difference between the maximum and minimum disparity values in the block is smaller than a second predefined threshold, which may be referred to as Disparity Difference Threshold. In that case, the mean of disparity values (i.e., sum/valid counting) is assigned to the center pixel in the block. A third scenario is applicable if the block has a sufficient number of valid pixels such the difference between the maximum and minimum disparity values in the block is larger than the Disparity Difference Threshold. In that case, the most frequent disparity value from among the maximum value, the second maximum value, the minimum value, and the second minimum value is assigned to the center pixel of the block. Examples of the foregoing scenarios are described below with reference to FIGS. 4A-4D.

Figure 4A:
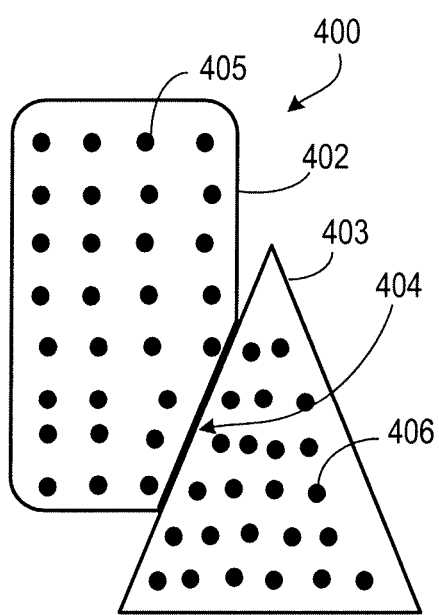
FIGS. 4A-4D illustrate examples of scenarios for updating the disparity value of a center pixel of a block.

FIG. 4A illustrates an example of an image of a scene 400 that includes two objects 402, 403. The figure also indicates the geometric edge 404 between the two objects 402, 403. The dots (e.g., 405, 406) indicate positions in the disparity map that have been assigned a respective disparity value. In the illustrated example, it is assumed that the disparity map is relatively sparse. Although additional disparity values could be filled, for example, simply by using average values of the existing disparity values, such an approach can blur the geometric edge 404 and enlarge the objects 402, 403, which is undesirable.

Figure 4B:
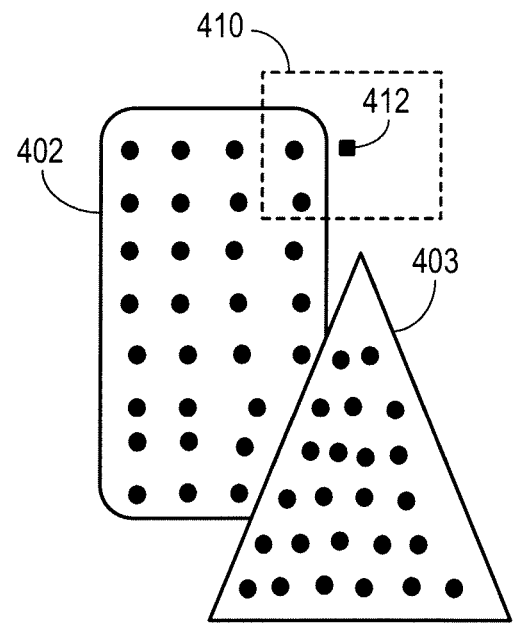

FIG. 4B illustrates an example of the first scenario mentioned above. In this case, the block (i.e., kernel) 410 has a center pixel 412. There are very few pixels (i.e., two) within the block 410 that already have an assigned disparity value. Assuming that, as in this example, the number of pixels in the block that have been assigned a disparity value is less than the Valid Number Threshold (i.e., the first predefined threshold), then the center pixel 412 is not assigned a disparity value (or its value remains 0, indicating that the value is invalid).

Figure 4C:
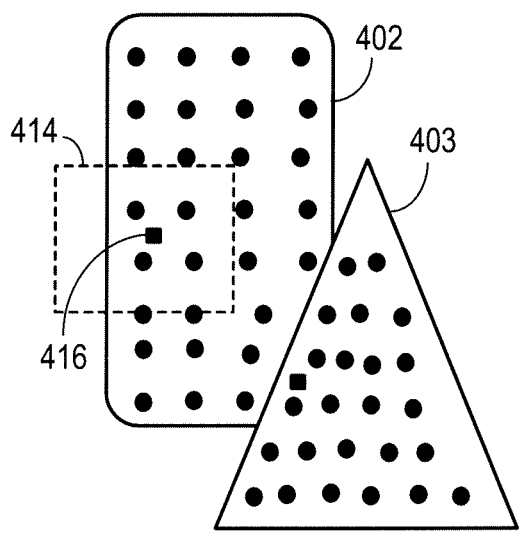

FIG. 4C illustrates an example of the second scenario mentioned above. In this case, the block 414 has a center pixel 416 and includes multiple pixels that have valid disparity values. Assuming that the difference between the various disparity values in the block 414 is small (i.e., maximum value−minimum value<Disparity Difference Threshold), then the center pixel 416 is assigned a disparity value equal to the average of the disparity values of the other pixels in the block 414.

Figure 4D:
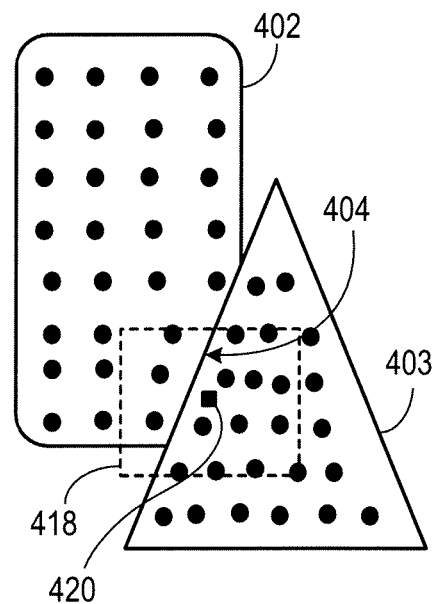

FIG. 4D illustrates an example of the third scenario mentioned above. In this case, the block 418 has a center pixel 420 and includes multiple pixels that have valid disparity values. In particular, in the example of FIG. 4D, the block 418 encompasses the geometric edge 404. Assuming that the difference between the various disparity values in the block 418 is large (i.e., maximum value−minimum value≥Disparity Difference Threshold), then the center pixel 420 is assigned a disparity value equal to the most frequent disparity value the other pixels in the block 420. In some cases, instead of selecting the most frequent value of from among all the disparity values in the block, the most frequent value is selected from a predefined subset of the values assigned to pixels in the block (e.g., the maximum disparity value in the block; the second maximum disparity value in the block; the minimum disparity value in the block; and the second minimum disparity value in the block). Using such a subset of disparity values from which to assign a disparity value to the block's center pixel 420 can help preserve the geometric edge 404. The number of disparity values within the subset is predefined for a given implementation, but in general there is tradeoff between computational speed and performance.

As is evident from the foregoing scenarios described in connection with FIGS. 4B-4D, updating the disparity value of the center pixel of the block may result in a specific disparity value being assigned to the center pixel or, in some cases, may result in the center pixel continue to have an invalid disparity value (i.e., a value of zero).

Returning to FIG. 3, after updating the center pixel of the block (304), the process checks whether the end of the column of pixels has been reached (306). If it has, then scanning of the disparity map by the interpolation engine 136 is complete 318. Otherwise, the process continues to scan blocks of pixels as described above until all rows and columns have been scanned. Thus, if scanning of the current columns is not yet complete, the process shifts the position of the block downward (308). For example, a specified number of rows (e.g., one) is added at the bottom of the block, and the interpolation engine 136 calculates the following values for the current block (308A): (i) sum of the valid disparity values for pixels within the block; (ii) number of valid pixels within the block; (iii) maximum disparity value and its frequency of occurrence within the block; (iv) second maximum disparity value and its frequency of occurrence within the block; (v) minimum disparity value and its frequency of occurrence within the block; (vi) second minimum disparity value and its frequency of occurrence within the block. Next, a specified number (e.g., one) of rows is subtracted from the top of the block, and the interpolation engine 136 recalculates the following values for the current block (308B): (i) sum of the valid disparity values for pixels within the block; (ii) number of valid pixels within the block; (iii) maximum disparity value and its frequency of occurrence within the block; (iv) second maximum disparity value and its frequency of occurrence within the block; (v) minimum disparity value and its frequency of occurrence within the block; (vi) second minimum disparity value and its frequency of occurrence within the block. The interpolation engine 136 then updates the disparity value of the center pixel of the block (310) in the same manner as described above in 304. Thus, if the current disparity value of the center pixel of the block is invalid (i.e., if it previously was assigned a value of 0 or was assigned no value), the interpolation engine 136 updates the disparity value of the center pixel of the block based on which of the first, second or third scenarios is applicable.

After 310, the process checks whether the end of the row of pixels has been reached (312). If it has, the process returns to 306. Otherwise, the process continues to scan the current row by shifting the block horizontally to the right (314). For example, a specified number of columns (e.g., one) is added at the right-hand side of the block, and the interpolation engine 136 calculates the following values for the current block (314A): (i) sum of the valid disparity values for pixels within the block; (ii) number of valid pixels within the block; (iii) maximum disparity value and its frequency of occurrence within the block; (iv) second maximum disparity value and its frequency of occurrence within the block; (v) minimum disparity value and its frequency of occurrence within the block; (vi) second minimum disparity value and its frequency of occurrence within the block. Next, a specified number (e.g., one) of columns is subtracted from the left-hand side of the block, and the interpolation engine 136 recalculates the following values for the current block (314B): (i) sum of the valid disparity values for pixels within the block; (ii) number of valid pixels within the block; (iii) maximum disparity value and its frequency of occurrence within the block; (iv) second maximum disparity value and its frequency of occurrence within the block; (v) minimum disparity value and its frequency of occurrence within the block; (vi) second minimum disparity value and its frequency of occurrence within the block. The interpolation engine 136 then updates the disparity value of the center pixel of the block (316) in the same manner as described above in 304. Thus, if the current disparity value of the center pixel of the block is invalid (i.e., if it previously was assigned a value of 0 or was assigned no value), the interpolation engine 136 updates the disparity value of the center pixel of the block based on which of the first, second or third scenarios is applicable. The process then returns to 312 and continues to shift the block through the various rows and columns until the entire array of pixels represented by the disparity map is scanned.

In the foregoing description of FIGS. 3 and 4A-4D, reference is made to the center pixel of the block. In other implementations, however, the various actions taken with respect to the center pixel can be taken instead with respect to a designated pixel other than the center pixel.

Figure 3A:
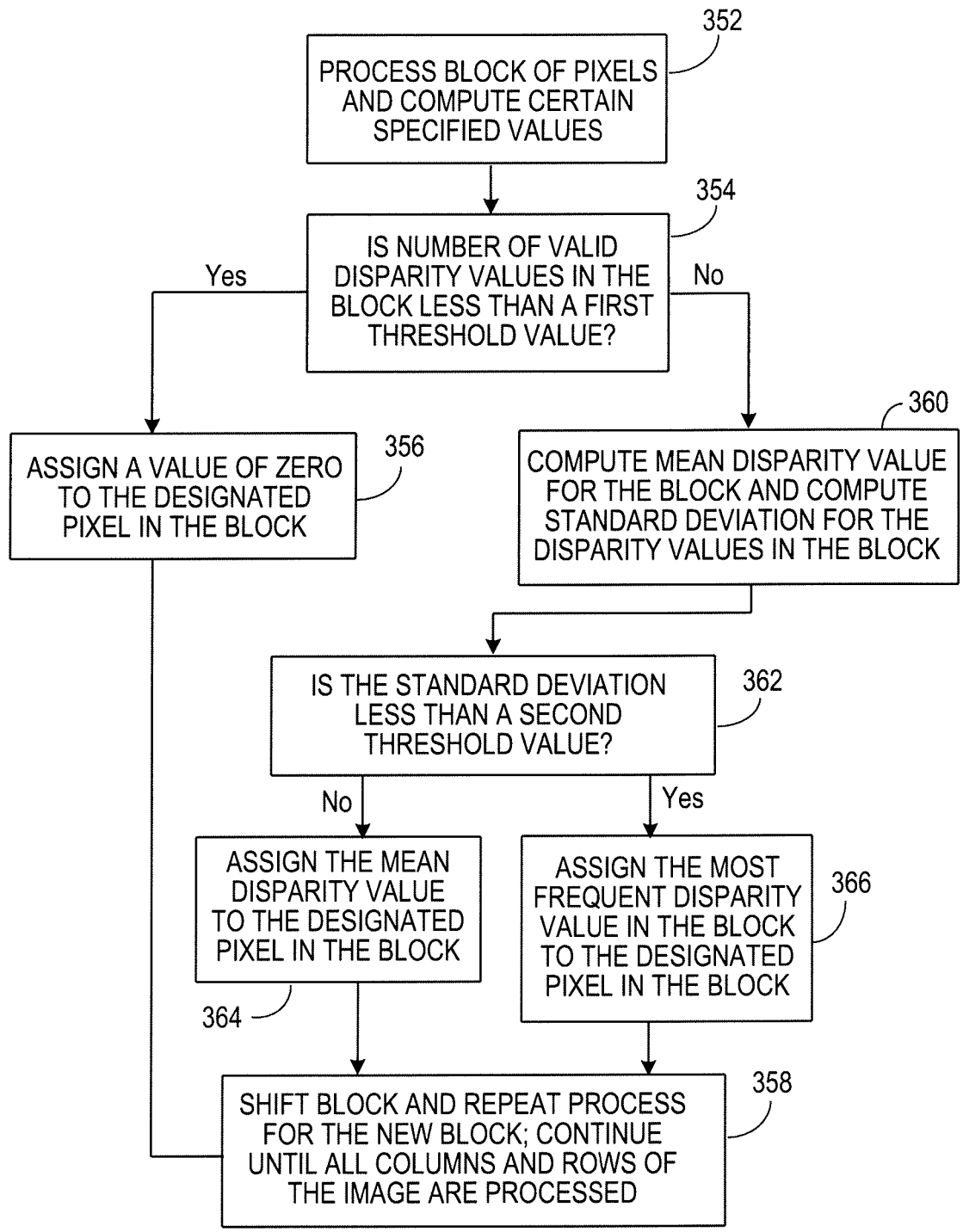
FIG. 3A is a flow chart illustrating anther example of an interpolation process to fill out disparity values in a disparity map.

FIG. 3A illustrates another version of the interpolation process (212 in FIG. 2) according to some implementations. As in the example of FIG. 3, the input to the interpolation engine 136 is a sparse disparity map that can be stored, for example, in an input buffer. In some cases, fewer than 10% of the pixels may have a disparity value associated with them. A block size is selected, for example, based upon the sparseness of the disparity map and/or the noise level. As shown in FIG. 3A, at 352, the interpolation engine 136 processes an initial block (or kernel) of the disparity map and computes certain specified values. The initial block can be located, for example, in the upper left corner of the disparity map, and represents a window encompassing a predetermined number of pixels. In this case, the interpolation engine 136 computes the following values for the block: (i) number ('n') of valid (i.e., non-zero) disparity values within the block; (ii) sum of the valid disparity values within the block; and (iii) sum of the square of the valid disparity values within the block. These values may be stored, for example, in temporary buffers associated with the interpolation engine 136 for use in subsequent processing steps.

Next, as indicated by 354, the engine 136 compares the number ('n') of valid disparity values to a previously determined first minimum threshold value and determines whether the number of valid disparity values is less than the first minimum threshold value (or equivalently, whether the number n is equal to or greater than the first minimum threshold value). The first minimum threshold value can be determined experimentally and may depend, for example, on bock size. In some instances, the first minimum threshold value is equal to 8% of the number of the pixels in the block.

If the number (n) of valid disparity values in the block is less than the first minimum threshold value, then it is assumed that the block likely has captured noise. Thus, in this case, a value of zero is assigned to a designated pixel (e.g., the bottom right-hand pixel) in the block (356). The assigned value can be stored, for example, in an output buffer. The process then continues by shifting the block, for example, by one column or row (358) and repeating the process for the new block.

On the other hand, if at 354 the interpolation engine 136 determines that the number (n) of valid disparity values in the block is equal to or greater than the first minimum threshold value, then the interpolation engine 136 computes the mean disparity value for the block, as well as a standard deviation for the disparity values in the block (360). These values can be stored, for example, in temporary buffers. For non-real time applications, where fast computation is less important, the standard deviation can be calculated, for example, as follows:

$$Stnd.\ Dev. = \sqrt{\frac{\sum((x-\bar{x})^2)}{n}}$$

where x is the disparity value of a particular pixel, $\bar{x}$ is the mean value of the disparity values of the block, and n is the number of pixels in the block having a valid (i.e., non-zero) disparity value. For real-time applications, where fast computation is important, a modified standard deviation can be calculated, for example, as follows:

$$Stnd.\ Dev. = \sqrt{\frac{(\sum x^2 + n\bar{x}^2 + 2\bar{x}\sum x)}{n}}.$$

Next, as indicated by 362, the interpolation engine 136 compares the computed standard deviation to a previously determined second minimum threshold value and determines whether the computed standard deviation value is less than the second minimum threshold value (or equivalently, whether the computed standard deviation value is equal to or greater than the second minimum threshold value). The second minimum threshold value can depend, for example, on the intended application (e.g., the difference in distance between the background and foreground of a scene to be captured in the images acquired by the cameras). If the computed standard deviation is smaller than the second threshold value, the interpolation engine 136 assigns the previously calculated mean disparity value to a designated pixel (e.g., the bottom right-hand pixel) in the block (364). The assigned disparity value can be stored in the output buffer. When the computed standard deviation is smaller than the second threshold value, this indicates that the block of pixels encompasses a surface having a near-constant distance from the camera.

On the other hand, if at 362 the interpolation engine 136 determines that the computed standard deviation is equal to or larger than the second threshold value, this indicates that the block falls on an edge. In that case, the interpolation engine 136 determines the most frequent disparity value among the pixels in the block and assigns that most frequent disparity value to the designated pixel (e.g., the bottom right-hand pixel) in the block (366). In this case, the assigned disparity value is an actual value, rather than simply an average value. This step allows the process to retain edges, rather than averaging them out. The assigned value can be stored, for example, in the output buffer. The process then continues by shifting the block, for example, by one column or row (358) and repeating the process for the new block.

The foregoing process of FIG. 3A can be repeated for each block until the entire image is processed. Using the foregoing process, and assuming (i) a block size of S×S pixels, (ii) a shift by one column or one row at a time during each iteration of the steps in FIG. 3A, and (iii) the designated pixel to be assigned a disparity value during each iteration is the pixel in the bottom right-hand corner of the block, then the uppermost S rows and the left-most S columns will not be assigned a disparity value during the foregoing process of FIG. 3A. Such pixels, however, can simply be assigned a disparity value, for example, of zero.

Figure 5:
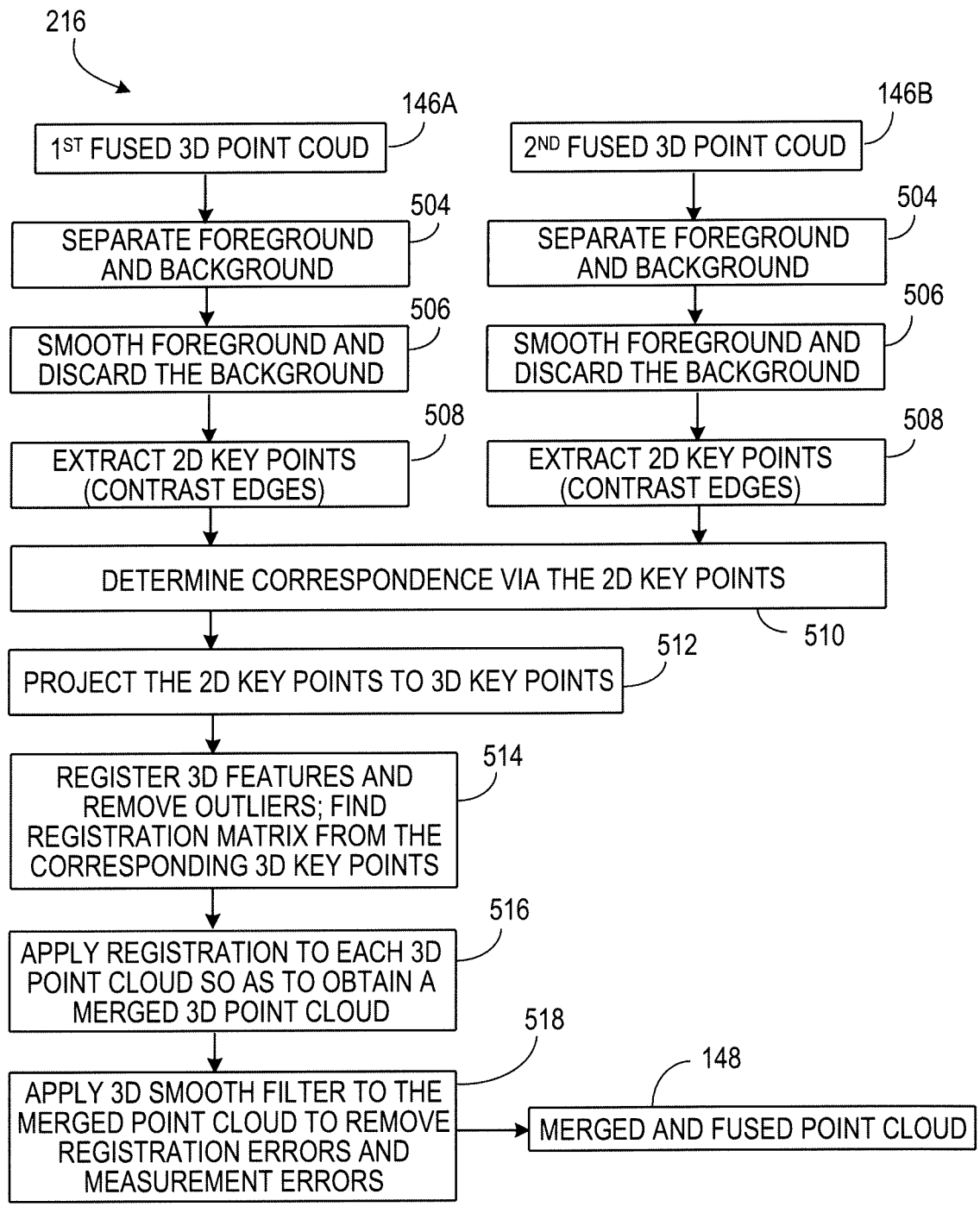
FIG. 5 is a flow chart illustrating an example of a registration process for merging two or more 3D point clouds.

FIG. 5 illustrates further details of the registration process (216 in FIG. 2) executed by the registration engine 140 according to some implementations. As explained above, the registration process 216 receives two or more fused (i.e., color) 3D point clouds 146A, 146B as input. The registration process 216 uses the 2D color information acquired by the third image capture device 116 to enhance the registration process, which merges the individual discrete 3D point clouds 146A, 146B to generate and output a merged, fused 3D point cloud 148.

As part of the registration process 216, the registration engine 140 identifies and separates foreground and background regions of each of the discrete fused 3D point clouds 146A, 146B (504 in FIG. 5). Any one of various known foreground-separation techniques (sometimes referred to as foreground detection) can be used. In some instances, a predefined threshold depth value may be used to delineate between pixels belonging to the foreground or background. The predefined threshold may depend, for example, in the sensitivity of sensors in the image capture devices 114A, 114B, as well as other factors.

The registration process 216 includes extracting and smoothing the foreground of each point cloud and/or subtracting (i.e., removing) the background of each point cloud (506 in FIG. 5). Any one of various known smoothing techniques can be used. Examples of such techniques include Gaussian filters, bilateral filters, and low-pass filters. Next, the 2D key points for the foreground of each point cloud are extracted (508). In this context, 2D key points are defined by gradients in the color/grey scale of the point clouds and correspond to contrast edges (rather than geometric edges). Examples of algorithms that can be used to extract the 2D key points of the foreground are the Scale-invariant feature transform (SIFT) algorithm, and the speeded-up version of SIFT (SURF) algorithm Other algorithms can be used as well. Steps 506 and 508 in FIG. 5 are performed, respectively, for each of the discrete fused 3D point clouds 146A, 146B.

Following the 2D key point extraction (508), the registration engine 140 identifies the correspondence between the various discrete 3D point clouds (510). The correspondence among the two or more 3D point clouds is determined based on using the 2D key points to identify matching regions among the two or more discrete 3D point clouds. Thus, this part of the registration 216 process is an example of how contrast edges (e.g., the RGB color data from the third image capture device 116) is used to enhance the registration process and identify the corresponding points between the two or more 3D point clouds. Using contrast edges (rather than geometric edges) to determine such correspondence can be advantageous because, as explained above, the depth channels initially provided only low z-resolution and sparse disparity.

After determining the correspondence between the various 3D point clouds, the process 216 projects the identified key points onto the 3D key points (512). Thus, the process 216 correlates the coordinates of the 2D key points to 3D key points. In particular, the disparity value associated with a particular pixel or set of pixels for a 2D key point are projected back as a depth value for the corresponding 3D point cloud. Next, the process 216 registers the 3D features and can remove outliers (514). The registration matrix can be obtained from the corresponding 3D key points. The process 216 applies a registration transformation to each 3D point cloud so as to obtain a merged 3D point cloud (i.e., in contrast to two or more discrete 3D point clouds) (516). In some instances, the process 216 applies a 3D smooth filter to the merged 3D point cloud so as to remove registration errors and/or measurement errors (518). As previously explained, the output of the registration engine 140 resulting from the process 216 is a merged, fused 3D point cloud 148.

The techniques described here can be particularly advantageous, for example, in hand-held mobile devices and other applications where the baseline (distance between depth channels) tends to be small, where the image and optics for the depth channels tends to be of relatively poorer quality, and where computing time needs to be relatively fast (e.g., real-time or near real-time). Of course, the techniques can be used for other applications as well.

In some cases, the merged, fused 3D point cloud can be displayed as a computer aided design (CAD) model on the computer screen. Further, in some cases, the merged, fused three-dimensional point cloud can be provided as input to a 3D printer operable to make a physical object from a three-dimensional digital model, for example, by laying down many successive thin layers of a material. The 3D scanner can be integrated, for example, into a smart phone or other handheld computing device.

In some instances, one or more processors can perform down-sampling of the merged, fused three-dimensional point cloud so as to reduce the amount of data. Further, in some cases, resulting data can be smoothed so as to eliminate redundant information. For example, the spatial and color information (x, y, z, c) can be averaged, which can help reduce the file size and make it easier to handle. The smoothed data then can be used, for example, to form a mesh model, which in turn can be used as the input to a display, 3D printer or other device.

Various implementations described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be readily apparent, various modifications can be made to the foregoing examples within the spirit of the invention. For example, in some instances, some processes or steps may be omitted. Further, in some cases, additional processes or steps may be performed. Other modifications may be made as well. Thus, other implementations are within the scope of the claims.

What is claimed is:

1. A method for presenting a merged, fused three-dimensional point cloud, comprising:
   acquiring a plurality of sets of images of a scene from different vantage points, each set of images including a respective plurality of stereo matched images and a color image;
   for each respective set of images:
      obtaining a disparity map based on the plurality of stereo images;
      fusing data from the color image onto the disparity map so as to generate a fused disparity map; and
      creating a three-dimensional fused point cloud from the fused disparity map; and
   merging together each of the respective three-dimensional fused point clouds so as to obtain a merged, fused three-dimensional point cloud;
   wherein fusing data from the color image onto the disparity map includes converting between color and grey-scale values.

2. The method of claim 1 wherein merging together each of the respective three-dimensional fused point clouds includes determining a correspondence between discrete ones of the three-dimensional fused point clouds based, at least in part, on contrast edge information obtained from the respective images.

3. The method of claim 1 wherein merging together each of the respective three-dimensional fused point clouds includes:
   extracting respective two-dimensional key points from each of the three-dimensional color point clouds; and
   identifying matching two-dimensional key points among different ones of the three-dimensional fused point clouds.

4. The method of claim 3 wherein the two-dimensional key points correspond to contrast edges.

5. The method of claim 1 wherein fusing data from the color image onto the disparity map further includes converting between high- and low resolution images.

6. The method of claim 1 including displaying the merged, fused three-dimensional point cloud on a display screen of a hand-held mobile device.

7. The method of claim 1 including displaying the merged, fused three-dimensional point cloud on a display screen of a computing device and, in response to receiving user input, rotating the merged, fused three-dimensional point cloud on the display screen.

8. The method of claim 1 including displaying the merged, fused three-dimensional point cloud on a display screen, wherein different depths or ranges of depth are displayed as different colors or using other visual indicators to differentiate between the different depths or ranges of depth.

9. The method of claim 1 further including performing an interpolation process to reduce sparseness of the disparity map or the fused disparity map, the interpolation process including:
   scanning the disparity map or the fused disparity map using a block of specified size; and
   updating a disparity value for a designated pixel of each particular block during the scanning if the designated pixel of the particular block has a current disparity value that is invalid.

10. The method of claim 9 wherein updating a disparity value for a designated pixel of each particular block preserves geometric edges of the disparity map or the fused disparity map.

11. The method of claim 9 wherein updating a disparity value for a designated pixel of each particular block if the designated pixel has a current disparity value that is invalid includes:
- if the particular block has a number of valid pixels such that a difference between maximum and minimum disparity values in the particular block is smaller than a second predefined threshold, assigning a mean disparity value to the designated pixel in the particular block; and
- if the particular block has a number of valid pixels such that a difference between the maximum and minimum disparity values in the particular block is larger than the second predefined threshold, assigning to the designated pixel of the particular block a disparity value equal to a most frequent disparity value from among a predefined subset of disparity values in the particular block.

12. A method of converting a relatively sparse disparity map into a less sparse disparity map, the method comprising:
- scanning the disparity map using a block of specified size; and
- updating a disparity value for a designated pixel of each particular block during the scanning in response to the designated pixel of the particular block having a current disparity value that is invalid,
- wherein updating the disparity value includes
  - assigning a mean disparity value to the designated pixel in the particular block when the particular block has a number of valid pixels such that a difference between maximum and minimum disparity values in the particular block is smaller than a second predefined threshold, and
  - assigning to the designated pixel of the particular block a disparity value equal to a most frequent disparity value from among a predefined subset of disparity values in the particular block when the particular block has a number of valid pixels such that a difference between the maximum and minimum disparity values in the particular block is larger than the second predefined threshold;
- wherein updating the disparity value for the designated pixel of each particular block preserves geometric edges of the disparity map.

13. The method of claim 1 wherein the sets of images are acquired using a plurality of depth channels including infrared sensors to acquire stereo matched images and a third channel including a RGB sensor to acquire color images.

14. The method of claim 1 further including performing an interpolation process to reduce sparseness of the disparity map or the fused disparity map, the interpolation process including:
- scanning the disparity map or the fused disparity map using a specified block size;
- updating a disparity value of a designated pixel in a particular block, wherein the updating includes:
  - determining whether a number of pixels in the particular block having a valid disparity value is less than a first threshold value, and
  - if the number of valid disparity values in the particular block is greater than a first threshold value, determining whether a standard deviation for disparity values of pixels in the particular block is less than a second threshold value, and
  - if the standard deviation for disparity values of pixels in the particular block is less than the second threshold value, assigning a most frequent disparity value in the particular block to the designated pixel.

15. The method of claim 14 including repeating said updating for each of a plurality of blocks of pixels.

16. The method of claim 1 further including performing an interpolation process to reduce sparseness of the disparity map or the fused disparity map, the interpolation process including:
- scanning the disparity map or the fused disparity map using a specified block size;
- updating a disparity value of a designated pixel in a particular block, wherein the updating includes:
  - determining whether a number of pixels in the particular block having a valid disparity value is less than a first threshold value, and
  - if the number of pixels in the particular block having a valid disparity value is less than a first threshold value, assigning a value of zero to the designated pixel, and
  - if the number of valid disparity values in the particular block is greater than a first threshold value, determining whether a standard deviation for disparity values of pixels in the particular block is less than a second threshold value,
  - wherein if the standard deviation for disparity values of pixels in the particular block is less than the second threshold value, assigning a most frequent disparity value in the particular block to the designated pixel, and
  - if the standard deviation for disparity values of pixels in the particular block is not less than the second threshold value, assigning a mean disparity value for the pixels in the particular block to the designated pixel.

17. The method of claim 16 including repeating said updating for each of a plurality of blocks of pixels.

18. The method of claim 9 wherein in response to the designated pixel having a current disparity value that is invalid and a number of valid pixels in the particular block is smaller than a first predefined value, then leaving the disparity value of the designated pixel of the particular block as invalid.

* * * * *